(12) United States Patent
Pirovano

(10) Patent No.: US 6,600,643 B2
(45) Date of Patent: Jul. 29, 2003

(54) SUBMARINE CABLE BRANCHING UNIT WITH DOUBLE-COIL RELAYS

(75) Inventor: Alberto Pirovano, Casatenovo (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 20 days.

(21) Appl. No.: 10/026,559

(22) Filed: Dec. 27, 2001

(65) Prior Publication Data

US 2002/0122282 A1 Sep. 5, 2002

Related U.S. Application Data

(60) Provisional application No. 60/259,233, filed on Jan. 3, 2001.

(30) Foreign Application Priority Data

Dec. 27, 2000 (EP) ............................................ 00128548

(51) Int. Cl.$^7$ ................................................ H01H 47/00
(52) U.S. Cl. ...................................................... 361/191
(58) Field of Search ................................ 361/170, 191, 361/38, 47, 48

(56) References Cited

U.S. PATENT DOCUMENTS

| | | | |
|---|---|---|---|
| 4,798,969 A | 1/1989 | Inoue et al. | |
| 5,196,984 A | 3/1993 | Webb | |
| 5,214,312 A | 5/1993 | Inoue | |
| 5,517,383 A | 5/1996 | Webb | |
| 5,644,466 A | 7/1997 | Ohta | |
| 5,841,205 A | 11/1998 | Webb | |

FOREIGN PATENT DOCUMENTS

GB    2 280 341    1/1995

OTHER PUBLICATIONS

Perry et al., "Physical Design of the SL Branching Repeater", Journal of Lightwave Technology, vol. LT–2, pp. 889–894 (1984).

*Primary Examiner*—Edward H. Tso
(74) *Attorney, Agent, or Firm*—Finnegan, Henderson, Farabow, Garrett & Dunner, L.L.P.

(57) ABSTRACT

A submarine branching unit including at least one power relay having two separate coils, rather than a single coil. The first coil provides an initial magnetic field capable of closing an electrical circuit contact, while the second coil provides a redundant magnetic field that reinforces and backs-up the magnetic field generated by the first coil. The first low-voltage isolated coil of the relay is positioned in the path of the main trunk in a submarine communication system, and the second high-voltage isolated coil is located in the spur branch connected to sea earth. By this double-coil configuration, the independent and redundant relay power system ensures that the charged spur cable is not switched back to the main trunk when an open circuit occurs or any equivalent system failure that could show a current dropping to zero while the system voltage remains non-zero, avoiding high current passing through relay contacts and subsequent dangerous arcing, each being a possible cause of relay failure.

12 Claims, 4 Drawing Sheets

SUBMARINE CABLE BRANCHING UNIT WITH DOUBLE-COIL RELAYS

CROSS REFERENCE TO RELATED APPLICATIONS

This application claims the benefit of U.S. Provisional Application No. 60/259,233, filed Jan. 3, 2001, the content of which is incorporated herein by reference, and claims the right to priority based on European Application No. 00128548.5, filed Dec. 27, 2000.

BACKGROUND OF THE INVENTION

The present invention relates generally to a branching unit for underwater cables that uses a double-coil relay. More particularly, the present invention relates to a branching unit for underwater telecommunication and power cables having a relay armature that is magnetically switched by a first coil and that is reinforced by a second redundant coil.

Underwater or submarine cable systems were originally designed to provide a telecommunications link between two landing points separated by a body of water, such as between France and England. Optical fiber within the submarine cable could carry high bandwidth telecommunications across tens of kilometers without the need for amplification or regeneration.

As applications evolved that required transmission across larger distances, optical repeaters in the form of regenerators or amplifiers were required within the cable span, which mandated the availability of electrical power. Power feed lines and optical transmission lines were provided together in the submarine cables. These cable systems were soon improved to provide a telecommunications connection to three or more separate landing points by employing a branching unit at the junction of multiple cables under the body of water. A standard branching unit connected a main cable from one landing point and two spur cables from second and third landing points, respectively, in a Y-shaped arrangement.

FIG. 1 illustrates a typical three landing point connection scheme. Branching unit 100 physically interconnects the cables, coordinates the routing of the cables, and provides for power switching between the cables, among other things. Conventionally, stations at the landing points power repeaters 120 within the three cables in a two-sided and one-sided arrangement. In particular, the transmission of electrical direct current along a power feed line of the intervening cables is established between any two of the landing points, and the third landing point passes electrical current through its respective cable to a ground at sea earth. Relays within the branching unit establish the two-sided (bilateral) and one-sided (unilateral) feeding configuration and help to change it if a fault arises in one of the branches. More elaborate schemes also exist for connecting multiple landing points and multiple branching units in a submarine network.

The act of configuring a branching unit refers to coordinating the application of power from the respective landing points by providing a first power connection (two-sided) between any two landing points and a second power connection (one-sided) between the third landing point and sea earth. The two-sided power connection between the above two landing points can be either a two-end feeding as shown in FIGS. 2A, 2B, i.e., a generator is present at each of the two landing points or, alternatively, a one-end feeding, i.e., a generator is present at one of the landing points and the cable is grounded at the other of the two landing points.

FIGS. 2A and 2B illustrate the two configuration steps. As shown in FIG. 2A, a low current is caused to flow from landing point A to landing point C via branching unit 100. In this arrangement, the line from A to C is nominated as the main trunk, and the spur branch to landing point B is left in an open-circuit condition. FIG. 2B shows that after the main trunk has been established, the one-sided powering of the spur takes place by shunting the spur to sea earth at the branching unit and feeding the spur from landing point B.

Various publications describe this configuration process. U.S. Pat. No. 5,196,984 discloses a branching unit which employs electrical power feeding for repeaters and multiple branching units. The branching unit terminates three line cables and a sea earth and includes three high voltage element relays, only one of which is energized at a time. When electrical power is supplied between any two line cables, the third is isolated and connected to the sea earth. Short circuit or open circuit faults in one line cable may be isolated and connected to the sea earth, while allowing powering of the remaining two line cables that are free of faults.

Similarly, U.S. Pat. No. 5,214,312 discloses a power feed line switching circuit for a submarine branching unit having first, second and third electrical paths connected in a Y-shaped connection, and first, second and third terminals connected respectively thereto. The power feed line switching circuit also has first, second and third relays each including a drive unit inserted in the first, second and third terminals and a switching unit for disconnecting the corresponding terminal and connecting the terminal to the ground. The relays control the connections between the terminals and electrical paths for establishing a one-end power feed line or a two-end power feed line to maintain power feed for repeaters and the submarine branching unit by the plurality of relays.

U.S. Pat. No. 5,644,466 discloses a submarine cable branching system including a plurality of directional relays in respective power feed paths branched at a common node. Each of the directional relays is energized by a current flowing through the power feed path in a predetermined direction for energizing a corresponding switch provided in a different power feed path to establish a bilateral feed path and further a unilateral feed path. A bypassing switch is provided across one of the switches that forms the bilateral feed path such that the bypassing switch is urged to close in response to energization of a self-sustaining relay provided in the unilateral feed path.

Since the branching unit, repeaters and cables are laid underwater and are thus difficult to maintain, it is important that they have a high reliability to ensure uninterrupted telecommunications between the landing points. During power-up of the main trunk, however, the spur cable will acquire a charge related to the voltage drop at the branching unit and the length of the spur. Switching the spur cable to sea earth (typically the sea water) can cause a rapid discharge, which may damage contacts and relays within the branching unit. In particular, a relay that causes the spur cable to contact the sea earth is typically a high-voltage changeover relay. When actuation of the relay causes a make of the switch, an arc discharge will liberate a quantity of contact material. Acting as charge carriers, the liberated material may pass between the just opened contacts in the three-terminal relay. An avalanche effect could take place that causes the main cable to discharge across the contact gap with large amperage, leading to imminent failure or degradation of the relay and connection of the main cable to sea earth. In this scenario, either it could be impossible to power the system up and configure the system or an oscillation could be initiated between the main trunk and spur (see, e.g., U.S. Pat. No. 5,517,383 at columns 1 and 6).

U.S. Pat. Nos. 5,517,383 and 5,841,205 propose circuits to avoid this damage. In the '383 patent, an additional relay D and switch D1 are used to avoid dangerous arcing in the high voltage changeover relay such as C. Relay D is not a changeover relay and can withstand a greater amount of arcing without failing.

The '205 patent discloses the use of a two-stage relay to avoid damage from arcing. In this arrangement, the spur is disconnected from the main trunk when a defined current level is reached and then discharged by shorting its terminal station end (i.e., not underwater). After current in the main trunk ramps to a second level, the spur is connected to sea earth at the branching unit without arcing.

U.S. Pat. No. 4,798,969 discloses a branching unit circuit that includes an auxiliary relay that prevents the spur branch from re-connecting to the main trunk when its current falls to zero. A relay K1 in the main trunk controls the switch connecting the spur branch to sea earth. A latch-up relay K4 in the spur branch holds the spur branch out of contact with the main trunk if relay K1 opens and relay K4 remains energized. This configuration, however, requires additional relays and switches in the branching unit.

Applicants have found that these prior arrangements introduce unnecessary complexity and expense to a branching unit and its operation.

SUMMARY OF THE INVENTION

Applicants have observed that the above problem can be overcome with a branching unit that includes a relay with two separate coils, rather than a single coil. The relay can be energized by the magnetic field generated by either coil, and this magnetic field can be reinforced when currents of proper direction flow in both coils. Thus, once the relay is configured by the current flowing in one coil, the magnetic field that sets the configuration may be reinforced by sending current of proper direction through the other coil. Therefore, even if the current in the first coil should stop flowing, the relay will remain configured by the magnetic field generated by the second coil. Applicants have also observed that a branching unit that uses such a double-coil relay exhibits improved reliability and reduced relay failure.

In one aspect, a branching unit for use in submarine telecommunications systems consistent with the present invention includes first, second, and third cable terminations each coupled to a power feed line of a respective submarine cable, a ground termination, and first, second, and third high-voltage relays. The high-voltage relays each have a first coil and a first contact. The first coil of each high-voltage relay is positioned between two of the cable terminations respectively and has an energized state when a first threshold amount of current passes through the first coil and a de-energized state when a second threshold amount of current does not pass through the first coil. The first threshold amount of current for causing the energized state is greater than the second threshold amount of current for causing the de-energized state. The first contact of each high-voltage relay is positioned to connect the respective third cable termination with the ground termination when the respective first coil is in an energized state. At least one of the high-voltage relays includes a second coil in series with the respective third cable termination and the ground termination. The first contact is positioned to maintain the connection between the third cable termination and the ground termination when current exceeding a third threshold passes through the second coil. The first contact also connects the respective third cable termination with the other two cable terminations when both the first coil and the second coil are in a de-energized state.

Preferably, the first, second, and third high-voltage relays further include a second contact positioned to isolate the coils of the other two relays from each other when the respective first coil is in an energized state. More preferably, the first, second, and third high-voltage relays are arranged between the cable terminations in a delta network.

In another aspect, a branching unit for joining power feed lines of at least three submarine cables consistent with the present invention has first, second, and third cable terminations each coupled to a power feed line of a respective submarine cable, a ground termination, and a high-voltage relay. The high-voltage relay has a first coil in series with two of the cable terminations and a second coil in series with the third cable termination and the ground termination. The high-voltage relay includes at least one contact positioned to connect the third cable termination to the ground termination when electrical current in the first coil exceeds a first predetermined threshold. Further, the contact is positioned to disconnect the third cable termination from the ground termination and reconnect it to the other two cable terminations when electrical current in the first coil falls below a second predetermined threshold and electrical current in the second coil falls below a third predetermined threshold.

Preferably, the first predetermined threshold is about 60–100 mA for the first coil. Also, preferably the respective second and third predetermined thresholds for the first and second coils are 10–50 mA and 300–350 mA.

In still another aspect, an underwater optical telecommunication link according to the present invention comprises at least three submarine cables extended at least partly in a body of water and having first, second and third power feed terminations at respective landing points, each cable comprising at least an optical fiber and a power feed line electrically connected to the respective power feed termination; at least two power stations at the landing points to feed said power feed lines of the submarine cables; and a branching unit according to one of the other aspects of the invention, in said body of water, for joining said power feed lines of said submarine cable.

It is to be understood that both the foregoing general description and the following detailed description are exemplary and explanatory only and are intended to provide further explanation of the invention as claimed. The following description, as well as the practice of the invention, set forth and suggest additional advantages and purposes of the invention.

BRIEF DESCRIPTION OF THE DRAWINGS

The accompanying drawings, which are incorporated in and constitute a part of this specification, illustrate embodiments of the invention and, together with the description, serve to explain the advantages and principles of the invention.

DETAILED DESCRIPTION OF THE PREFERRED EMBODIMENTS

Figure 1:
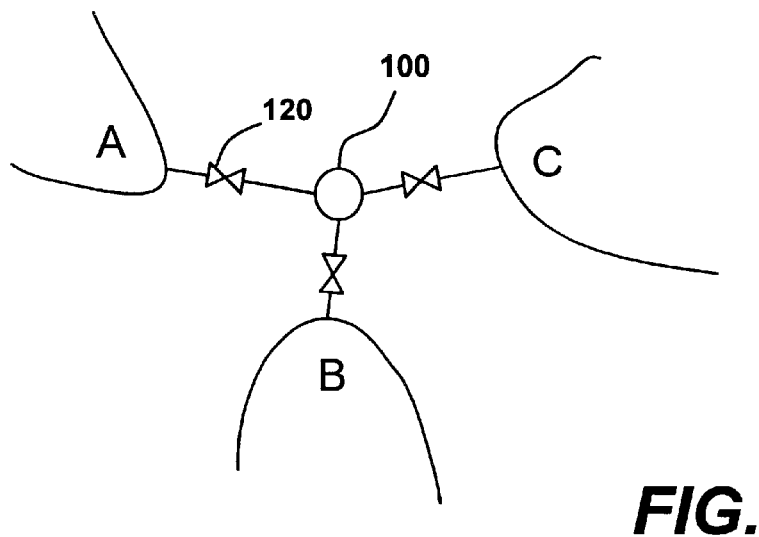
FIG. 1 is an illustration of a branching unit implemented in a submarine telecommunications system having three landing points.

Reference will now be made to various embodiments according to this invention, examples of which are shown in the accompanying drawings and will be obvious from the description of the invention. In the drawings, the same reference numbers represent the same or similar elements in the different drawings whenever possible.

Figure 3A:
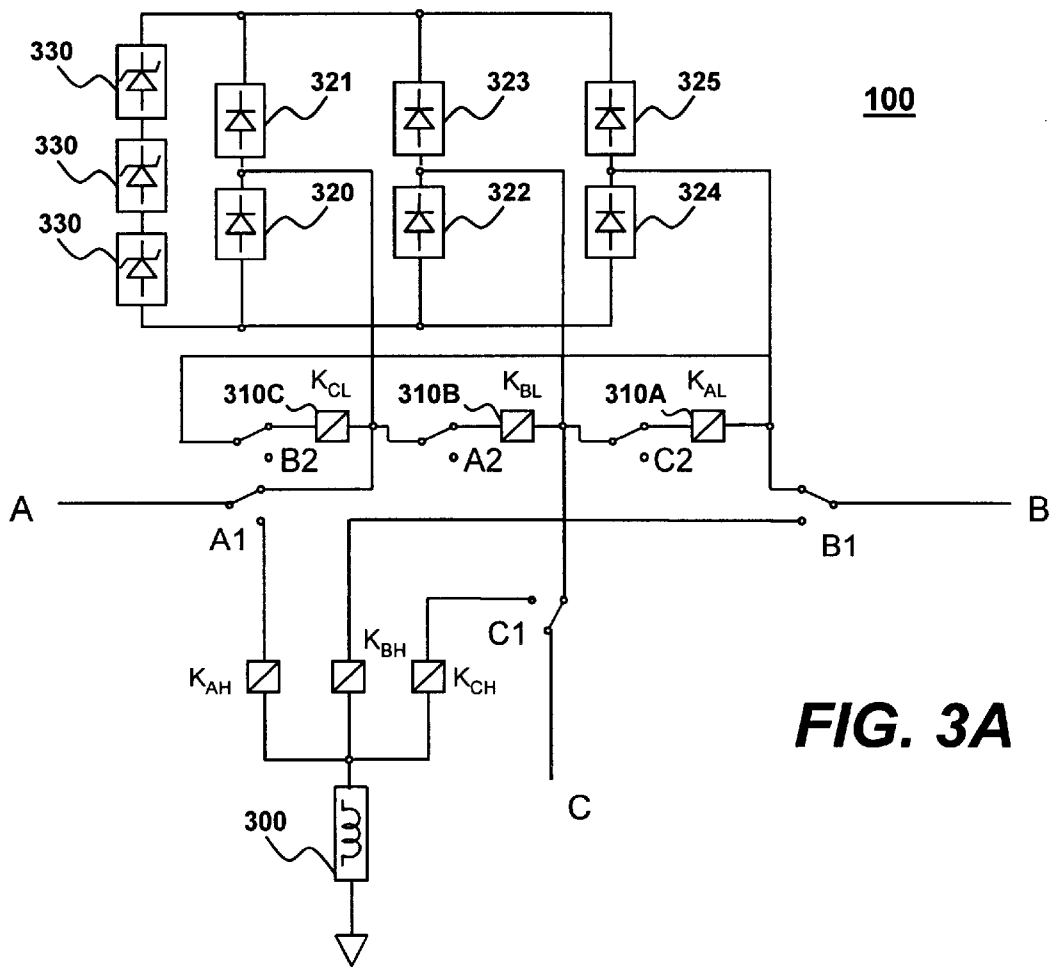
FIG. 3A is a schematic diagram of a branching unit consistent with the present invention in its de-configured state.

In accordance with the present invention, and as generally referred to as 100 in FIG. 3A, a branching unit consistent with the principles of the present invention includes first, second, and third cable terminations each coupled to a power feed line of a respective submarine cable, a ground termination, and first, second, and third high-voltage relays.

As embodied in FIG. 3A, branching unit 100 in FIG. 3A has three terminations or terminals A, B, and C that represent connections to respective landing points A, B, and C of FIG. 1. As will be understood, branching unit 100 is typically submerged in a large body of water like a sea or ocean, and submarine cables (not shown) travel from terminals A, B, and C to the landing points across distances. The submarine cables include both optical transmission fiber and power feed lines. FIG. 3A illustrates only the circuitry in branching unit 100 that corresponds to the electrical power and switching aspects of that device and not the routing or maintenance of the optical communication system.

Branching unit 100 is symmetrical. In other words, its layout is such that each of the terminals A, B, and C is electrically equivalent to each of the others, and the branching unit behaves in the same way no matter which submarine cable is selected to be the main trunk or which direction the current flows. In the symmetrical design, a bilateral powering scheme may be established between any two of terminals A-C, and a unilateral powering scheme may be then established for the remaining terminal. FIG. 3A shows branching unit 100 in its quiescent state prior to being configured, where all terminals are connected together and isolated from ground.

Branching unit 100 includes three high voltage relays 310. In accordance with the present invention, Applicants have discovered that replacing conventional single-coil high-voltage relays used in branching unit 100 with double-coil relays helps to deter damage to branching unit 100 in the event of an open circuit failure or any equivalent system failure that could show a current dropping to zero while the system voltage remains non-zero and even considerably high. As discussed, in conventional arrangements for branching units, a spur branch may re-connect with the main trunk upon an open-circuit failure that causes a large current to flow through the closing contact and may cause dangerous arcing of high voltage to sea earth. By employing double-coil relays, the present invention avoids such dangerous arcs and consequent damage to the relays.

In particular, one of the coils in one of the double-coil relays is used to switch one cable termination to sea earth as a spur branch, i.e. to configure the branching unit, while the other coil is used to maintain the connection of the spur branch to sea earth. After configuration, even if current is lost through the first relay coil due to an open circuit in the main trunk, the independent current flowing through the second coil in the spur branch will keep the spur branch isolated from the main trunk. The spur branch can be re-configured to connect with the main branch by lowering the current flowing through both the first and second coils.

Figure 3B:
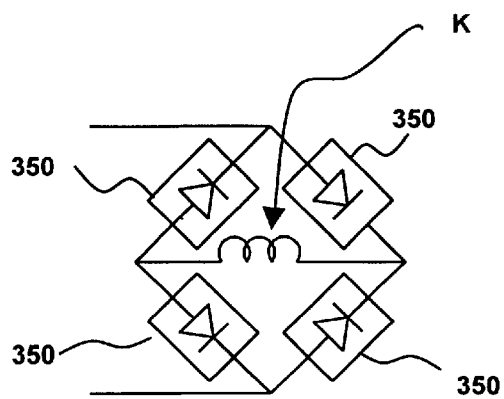
FIG. 3B is a schematic diagram of a low voltage coil portion of a high power high-voltage relay used within the branching unit shown in FIG. 3A.

As embodied in FIG. 3A, high voltage relays 310 each includes two coils designated $K_L$ and $K_H$. Relay coils $K_{AL}$, $K_{BL}$ and $K_{CL}$ are arranged in a delta network between the terminals A-C. As shown in FIG. 3B, each relay coil $K_L$ of a relay 310 has bridge rectifier diodes 350 to ensure that the relay does not become de-energized if a short circuit in a submarine cable causes a sudden reversal in current direction. Each high voltage relay 310 also has at least two contacts associated with it and may be a high-voltage changeover relay. The coil $K_L$ of each relay is disposed between two line terminals in the delta network. In particular, coil $K_{AL}$ of relay 310A is positioned between line terminals B and C, coil $K_{BL}$ of relay 310B is positioned between line terminals A and C, and coil $K_{CL}$ of relay 310C is positioned between line terminals A and B.

The contacts of relays 310 are designated with letters corresponding to their affiliated coil. For instance, switches A1 and A2 in FIG. 3A are controlled by the combination of relay coils $K_{AL}$ and $K_{AH}$. In general, a relay is positioned between two of the three line terminals and contact 1 for the relay is connected to the third line terminal, e.g., relay coil $K_{BL}$ is disposed between two terminals A and C, so that when relay $K_{BL}$ is energized, contact B1 will connect the third terminal B to sea earth. As well, contact 2 for the relay is positioned in series between the other two relay coils, e.g., contact B2 of relay coil $K_{BL}$ is in series between $K_{AL}$ and $K_{CL}$, so that when relay coil $K_{BL}$ is energized, switch B2 will open. This opening will break the series connection between terminal A and terminal B, which breaks a parallel connection between energized relay $K_{BL}$ and the series connection of relays $K_{AL}$ and $K_{CL}$ and prevents relay coils $K_{AL}$ and $K_{CL}$ from energizing.

As shown in FIG. 3A, the high voltage coils $K_{AH}$, $K_{BH}$, $K_{CH}$ of relays 310 are each disposed between a respective first contact A1, B1, C1 and sea earth.

Figure 3C:
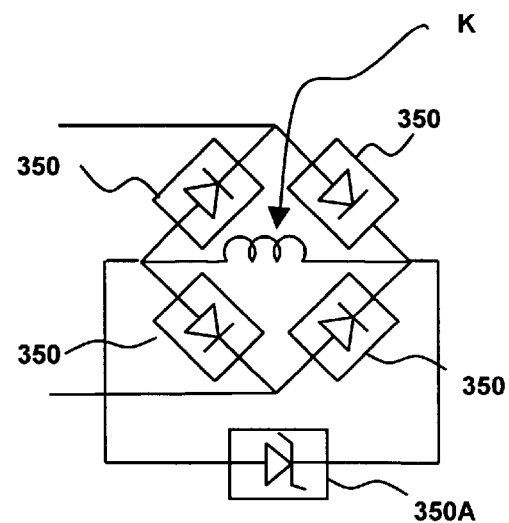
FIG. 3C is a schematic diagram of a high voltage coil portion of a high power high-voltage relay used within the branching unit shown in FIG. 3A.

Once the current flowing from terminal A to terminal C has connected terminal B to sea earth by energising $K_{BL}$, $K_{BH}$ can be powered independently from terminal B. The current that flows through independently powered coil $K_{BH}$ from terminal B produces a magnetic field that reinforces and backs-up the magnetic field caused by the current that flows through coil $K_{BL}$. Thus, if power is lost along terminals A to C and current flowing through bobbin $K_{BL}$ is concomitantly lost such that the magnetic field produced by bobbin $K_{BL}$ is lost, then the magnetic field produced by independently powered coil $K_{BH}$ keeps the armature closed such that contacts B1 and B2 cannot open the circuit. As shown in FIG. 3C, each high voltage relay coil $K_H$ may include a zener diode 350A around coil K and bridge rectifier diodes 350 that allows the magnetic field generated by independently powered coil $K_{BH}$ to reinforce the magnetic field caused by the current that flows through coil $K_{BL}$ no matter what direction the current flows in terminal B.

In addition to this main portion of the branching unit in the delta-relay network, a bridge rectifier places a power supply unit in parallel with whichever high voltage relay 310 that is active in a bilateral powering arrangement between two of terminals A to C. Specifically, at least six bridge rectifier diodes 320–325 are arranged with a series of zener diodes 330, as shown in FIG. 3A. Each zener can be used to feed electrical equipment located within the branching unit, e.g., associated with optical amplifiers. The zener diodes 330 simultaneously offer surge protection to any such electrical equipment. In the illustrated embodiment of the present invention, three zener diodes 330 are used, although other arrangements can be contemplated that do not deviate from the nature of the invention. In general, a lower limit to the number of zener diodes is linked to the pull-in voltage of the relays and an upper limit to the number of zener diodes is linked to dissipation of the relay coil.

A surge limiter 300 may be placed in series with each cable line at terminals A, B, and C.

In one embodiment of the invention, Applicants have used an inductor as current limiter 300. In another embodiment of the invention, Applicants have used an inductor in combination with a resistor in parallel for current limiter 300. In order to limit the peak current, the characteristic impedance at the relay contact should be increased at least for the expected pulse duration of 2 msec or frequencies greater than 500 Hz. For lower frequencies, it is desirable that the current limiter 300 behave as close as possible to a short circuit to avoid undesired power dissipation. A good compromise is to use an air coil of about 30 mH in parallel to a power resistance of 70–90 Ohm to give an equivalent impedance of about 63 Ohm for frequencies greater than 500 Hz. The current limiter impedance will be added to a typical line impedance of 25–30 Ohm to give a total limiting impedance of about 90 Ohm.

Applicants have constructed an inductor comprising an air bobbin to avoid any saturation when subjected to high peak current. To be easily located in the branching unit, the air bobbin has been wound on a coil having a large internal diameter (around 150 mm) to allow cable and fibers feeding through and for ease of mounting. The skilled in the art may determine, in each practical case, an appropriate inductance value for the inductor by balancing the advantage of any increase in the impedance value in view of the associated increase in series resistance and in view of space occupation. As a matter of fact, it is desirable to keep the series resistance as low as possible to reduce the DC power dissipation and space occupation is preferably kept to a minimum. Applicant has determined that the inductance value of the inductor, to achieve a significant current limiting effect, should be greater than about 100 $\mu$H, and preferably greater than about 1 mH.

An air bobbin 300 designed for use with this invention has the following physical characteristics. In an example, the internal diameter is about 150 mm, external diameter is about 224 mm, and the width is about 60 mm. In the example the bobbin 300 has around 420 turns of double enameled wire with a diameter of 1.5 mm wound on an insulating support. Such a construction leads to an inductance of about 34 mH, and a series resistance of about 2.2 Ohm. Those skilled in the art will realize that other values could be used in current limiter 300 to achieve desired current limiting results.

In another embodiment of the invention, the inductor within air bobbin 300 is placed in parallel with a plurality of resistors. The parallel resistance serves to avoid any possible high voltage reversal on the inductor when the configuration relay opens. In case of an open circuit, the resistor acts as a discharge path for the inductor, limiting the peak reverse voltage to a few hundred volts. In an example of this embodiment, a series of four wire wound resistors have been used to make the desired value and to be able to withstand the peak power dissipation and the peak voltage across each. The electrical characteristics of each wire wound resistor in the example had a power rating of about 15 W, resistance of about 22 Ohm, limiting element voltage of greater than about 2 KV, and adiabatic energy dissipation of about 120 J. Those skilled in the art will appreciate that resistors having other values could be used in current limiter 300 to achieve desired current limiting results.

Figure 2A:
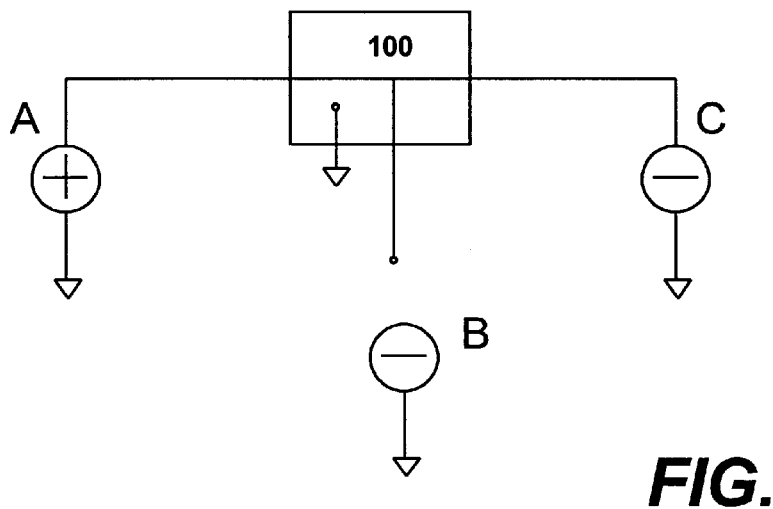
FIG. 2A is a schematic diagram of a branching unit implemented in a submarine telecommunications system after the first step of configuration.
Figure 2B:
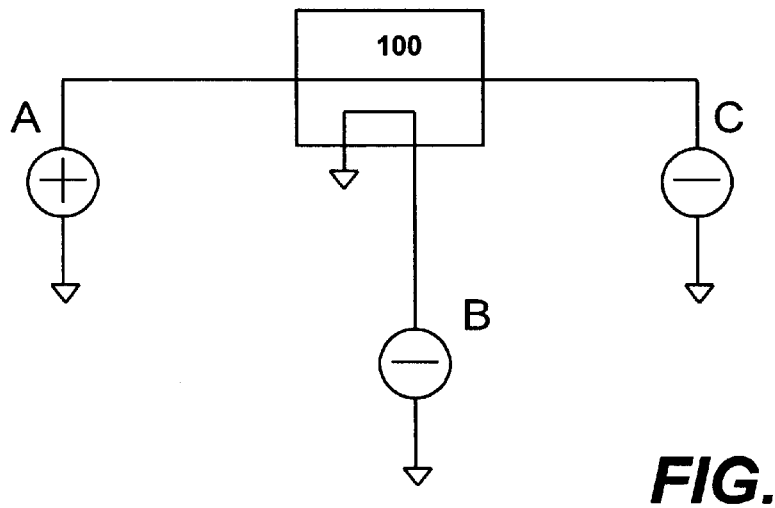
FIG. 2B is a schematic diagram of a branching unit implemented in a submarine telecommunications system after the second step of configuration.

An example of a configuration for branching unit 100 will help to illustrate the present invention. As shown in FIG. 2A, a current flow is first established from landing point A to landing point C. Current will flow into terminal A in branching unit 100 of FIG. 3A, through diodes 350 and coil $K_{BL}$ of relay 310B, and out terminal C. Current will also flow from terminal A, through rectifier diode 321, zener diodes 330, and rectifier diode 322 to terminal C. Power supplies at landing points A and/or C are coordinated to gradually increase the current flow over time. A typical rate at which the current is escalated may be 1 or 2 mA/sec up to a total amperage of 120 mA. As the current reaches a level of about 60 to 100 mA, sufficient current will pass through coil $K_{BL}$ to cause it to become energized, activating contacts B1 and B2. Contact B1 electrically disconnects terminal B and its affiliated submarine cable spur (not shown) from the other terminals and branches and connects terminal B to sea earth. Also, contact B2 opens, breaking the series connection between coils $K_{CL}$ to $K_{AL}$ and preventing contacts A1 and C1 from changing to sea earth. At this stage, the spur terminal B can be re-connected at its landing point station and is ready to be powered. Terminal B may be powered with a negative or positive voltage, but a negative voltage is usually used to prevent corrosion of the branching unit case and to preserve the integrity of the sea ground. This configured state is illustrated in FIG. 2B. As terminal B is powered, current flows through coil $K_{BH}$, which further secures contacts B1 and B2 in their positions.

The voltage drop across the high voltage relay 310B is held in place by zener diodes 330. Because relay coils $K_{AL}$ and $K_{CL}$ are no longer in parallel to relay coil $K_{BL}$, they are unable to be energized. Current in the main trunk, A to C, can now be ramped up, with a typical ramp rate of 10 mA/sec, up to a defined nominal current value.

During configuration and power-up of the system, the cable connected to terminal B, the spur cable, will acquire charge. The amount of energy stored in the cable is related to the voltage drop at the branching unit 100 at the point when relay coil $K_B$ becomes energized, generally 60–100 mA. This voltage drop is dictated by the length of the main trunk, A-C, and by the number of repeaters 110 along the main trunk. The energy in the spur is also related to the length of the spur from the branching unit to the landing point. The subsequent grounding of spur B via the actuation of high voltage relay 310B allows the spur to rapidly discharge. The rapid discharge of the spur could allow a large amount of current, limited only by the characteristic impedance of the cable, to flow through the relay contact. Current limiter 300 is, therefore, used to help avoid relay damage in this situation.

An open circuit fault on the main trunk is an important consideration in evaluating the life of a high-voltage relay in a branching unit. The two locations for the fault can either be "before" the branching unit or "after" the branching unit, and two types of powering schemes for the main trunk can be double-ended or single-ended. A fault "before" the branching unit refers to one that occurs at a location having a higher electrical potential (in absolute value) than the branching unit does, while "after" refers to the opposite situation. Double-ended powering exists when the main trunk is powered at both ends, i.e., positive voltage is applied at one landing point and negative voltage is applied at the opposite landing point. Single-ended powering is when voltage is applied at only one landing point and the opposite is grounded.

Figure 4A:
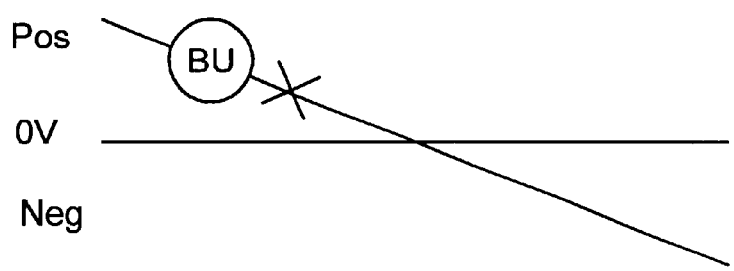
FIG. 4A is a plot of electrical potential versus distance showing a cable failure "after" a branching unit in a double-end feed system.
Figure 4B:
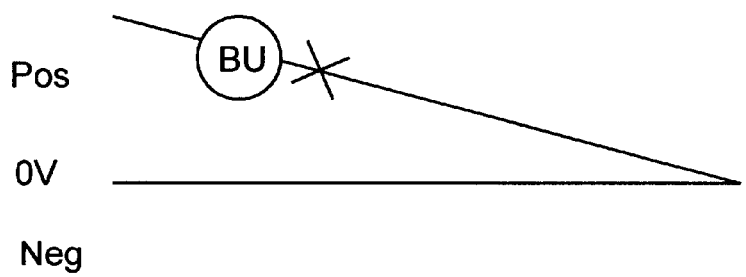
FIG. 4B is a plot of electrical potential versus distance showing a cable failure "after" a branching unit in a single-end feed system.

The following describes the operation of branching unit 100 consistent with the present invention in a failure caused by an open circuit "after" the branching unit on either a single-end or double-end powered main trunk after configuration has taken place. FIG. 4A depicts a plot of electrical potential versus distance and shows an open circuit failure in a double-end feed system that occurs "after" the branching unit, while FIG. 4B illustrates a similar plot for a single-end feed system. In these events, the current keeping the high voltage relay 310 energized will decrease due to the open circuit, which would normally tend to cause the affiliated contact 1 to disconnect the spur cable from sea earth and return branching unit 100 to its de-configurated state.

For example, if branching unit 100 has been configured so that the main trunk is cables A-C as described above, and an open circuit fault occurs on submarine cable C, then current will stop flowing in the main trunk. As such, relay 310B would normally become de-energized, causing contact B1 to change from contacting sea earth to contacting the main trunk. That is, the spur cable attached to terminal B would be switched from sea earth to the main trunk, and branching unit 100 would essentially return to a de-configured state. This switching would cause the contacts of B1 to go from 0 V at sea earth to up to $\frac{2}{3}*10$ kV for a main trunk voltage of 10 kV, resulting in a large amount of current flowing through high voltage relay contact B1. Such a current is evaluated according to the following equation:

$$I = \frac{2}{3} * Vsyst * \frac{1}{Z_0} \qquad (2)$$

where Vsyst is the maximum system voltage at the branching unit and $Z_0$ is the characteristic impedance of the submarine cable.

At present, submarine systems must handle a maximum system voltage up to 10 kV although higher voltages, e.g., 20 kV, are anticipated for the future.

For relatively high values of Vsyst the amount of current as given in equation (2) could irreversibly damage the relay. An arc would appear in the relay, which basically shorts the high voltage to sea earth via the same arc discharge phenomenon described above. In this case, the amount of current flowing in the relay can become in the order of:

$$I = 2 * Vsyst * \frac{1}{Z_0} \qquad (3)$$

This is what happens with the circuit described by M W Perry, G A Reinold and P A Yeisley in an article entitled "Physical Design of the SL Branching Repeater" in *Journal of Lightwave Technology*, Vol. LT-2, Dec. 1984, pp. 889–894.

Applicant has determined that, with the system described in U.S. Pat. No. 5,841,205, which discloses a so-called two stage configuration system, once the branching unit is de-configured following an open circuit failure, the earth relay D1 is opened before the configuration relay C1. This arrangement is helpful because in the relay envelope the powered cables do then not see the path to earth. But following this de-configuration, current flows from line A and line C into terminal B due to the stored charge in the line and presents a risk of branching unit reconfiguration. In particular, the current flow from the main trunk to the former spur branch is an impulse of high magnitude, with an amplitude exceeding the one required to configure the relays. Under these circumstances, both the configuration relays A-C and the earth relay D have a probability of being energized simultaneously. If the pull in time of the earth relay is less than the configuration relay, the earth relay will energize and the path to earth will re-close, which will remove the two-stage switching function designed to protect the branching unit. The result is that a high current path can be made through the earth relay with subsequent possible damage according to the following:

$$I = Vsyst * \frac{1}{Z_0} \qquad (4)$$

With the high power relays 310 of the present invention that have dual coils $K_L$ and $K_H$, the damage from large amounts of current and/or from arcing can be avoided. When the current flowing through, for example, coil $K_{BL}$ decreases to a point at which the relay would typically de-configure itself, the current flowing through affiliated coil $K_{BH}$ keeps the relay energized. Thus, in normal operation the current on the branch of the earthy side reinforces the magnetic field of relay 310B, and in an open circuit failure on the main trunk it keeps the relay energized.

Figure 5A:
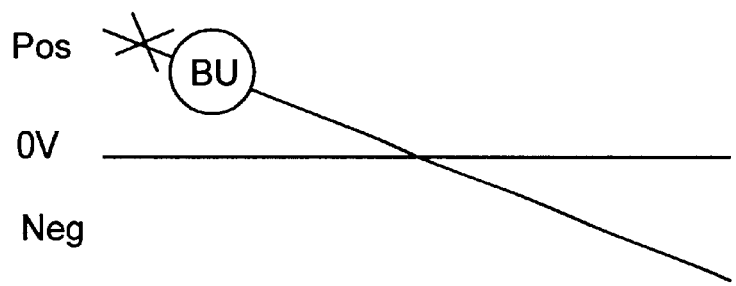
FIG. 5A is a plot of electrical potential versus distance showing a cable failure "before" a branching unit in a double-end feed system.
Figure 5B:
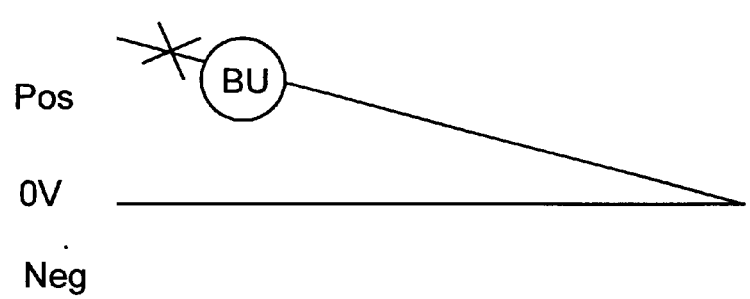
FIG. 5B is a plot of electrical potential versus distance showing a cable failure "before" a branching unit in a single-end feed system.

Performance of branching unit 100 is somewhat different in the event of an open circuit failure "before" the branching unit in either a single-end or double-end powering scheme. FIG. 5A depicts a plot of electrical potential versus distance and shows an open circuit failure in a double-end feed system that occurs "before" the branching unit, while FIG. 5B illustrates a similar plot but for a single-end feed system. In these situations, the current in the main trunk also falls below a level normally necessary to keep the high voltage relay 310B energized, which would cause contact B1 to return branching unit 100 to its de-configured state. However, due to the relationship between the potential at the fault location and the lower potential at the branching unit, the main trunk cable will rapidly discharge. As a result, the de-configuration switching would occur with little risk of catastrophic arcing. Nonetheless, coil $K_{BH}$ of the relay 310B in the present invention keeps the relay energized and avoids potential damage from arcing if contact B1 were to change states.

Once the relay 310B is initially magnetized by the first or low voltage coil $K_{BL}$ and an armature or other element is switched to a closed position, this closed position can be reinforced and backed-up by a magnetic field generated by the second or high voltage coil $K_{BH}$. Thus, in the event of power loss to the first coil $K_{BL}$, the second or high voltage coil $K_{BH}$ can back-up the first coil $K_{BL}$ and hold the armature latch or other element in the closed position. The amount of current needed to generate the magnetic field of the second or high voltage coil $K_{BH}$ is termed the "drop out" current. So long as the second coil $K_{BH}$ maintains a current above the drop out current, the magnetic field generated by the second coil $K_{BH}$ will be sufficient to keep the armature or other element closed in the event of power loss to the first coil $K_{BL}$.

The dual coil relays 310 of the present invention can preferably have the following characteristics. The first coil $K_L$ should preferably have a pull-in current to configure the relay of about 60–100 mA. Drop-out current for releasing the relay should preferably be about 10–50 mA. The second coil $K_H$ should preferably have a pull-in current of about 660–700 mA and a drop-out current of about 300–350 mA. The drop-out current for the second coil should be lower than the minimum envisaged system current.

Figure 6:
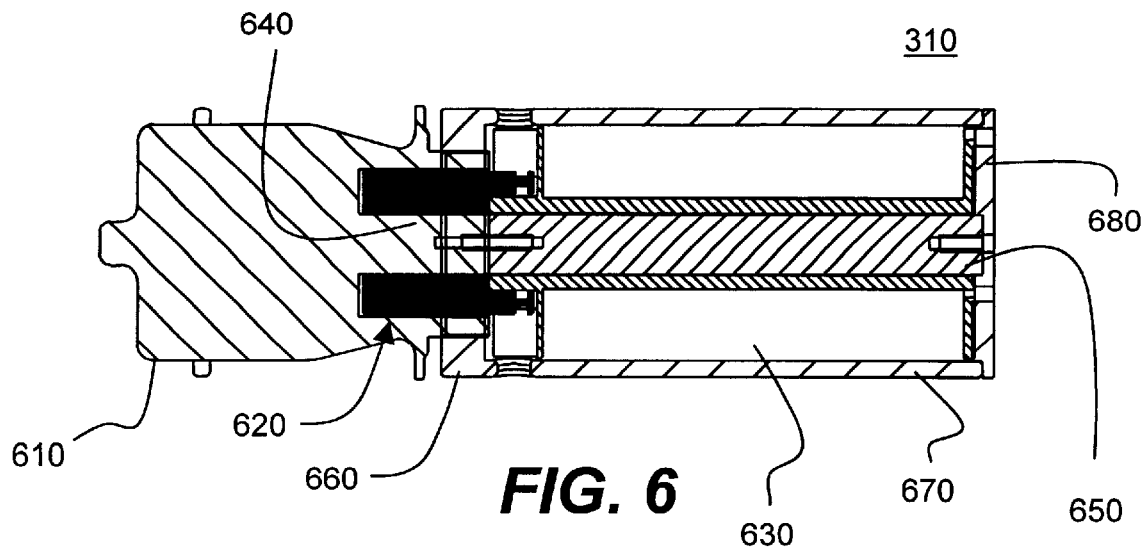
FIG. 6 is cross-sectional view of a double-coil high voltage relay used within the branching unit of FIG. 3A.
Figure 7:
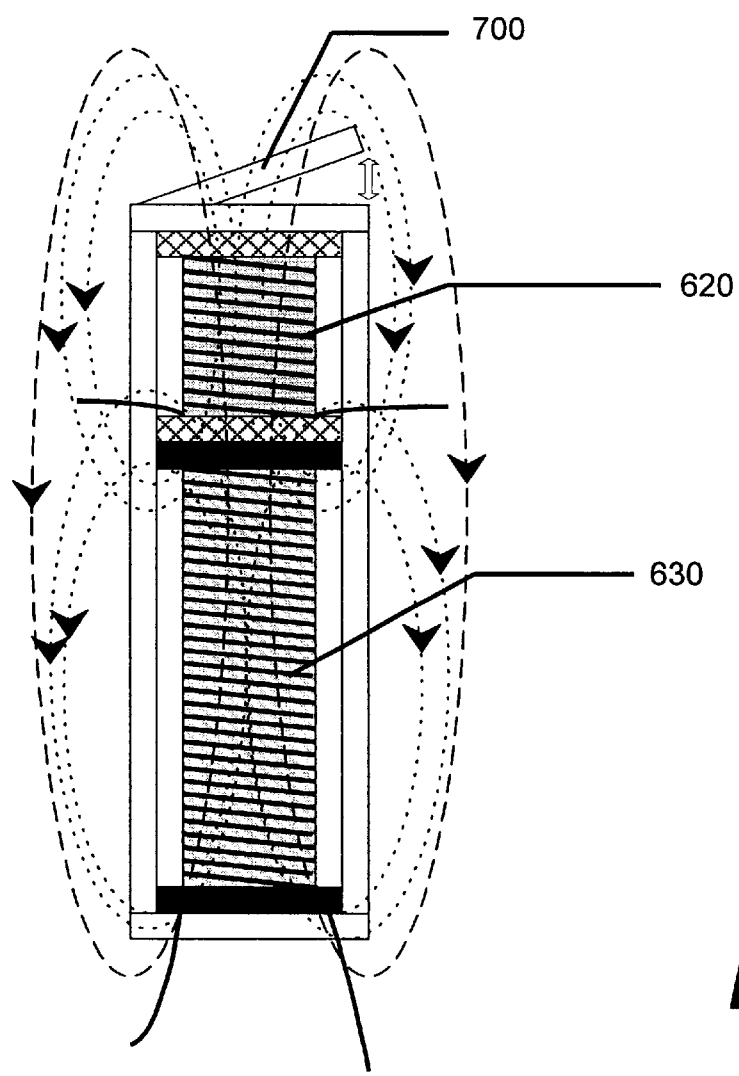
FIG. 7 is a side view of the double-coil high voltage relay of FIG. 6 showing magnetic flux in an operating condition.

FIGS. 6 and 7 show a double-coil relay 310 that can be used in connection with a submarine branching unit circuit to prevent the above-described open circuit failure. The double-coil relay 310 can also be used with other electrical systems, devices, circuits and branching units as will be understood by one of skill in the art. The double-coil relay 310 preferably comprises a relay device 610, a first coil 620 of wire wrapped around a first bobbin, and a second coil 630 of wire wrapped around a second bobbin.

Any of a variety of presently known or later developed relay devices 610 can be used. One such suitable relay device 610 is commercially available from CII Technologies of Santa Barbara, Calif. (USA) under the H19 or K19 series.

The first coil 620 is arranged on a portion of the relay device 610. The first coil 620 can be configured separately from the relay device 610 and then subsequently physically and electrically connected to the relay device 610, or it can be configured integrally with the relay device 610 and thus be pre-physically and pre-electrically connected to it. One such suitable first coil 620 is provided as an integral part of the H19 or K19 series relay device manufactured by CII Technologies.

The first coil 620 is arranged in a wound, wrapped or coiled configuration around a first coil support in the form of a bobbin. In the preferred coil provided with the H19 relay from CII Technologies, the first coil 620 has a series resistance of preferably about 225 Ohms. The first coil 620 is a thin enamel wire wound on a plastic bobbin, and the overall coil is then molded. A shaft 640, which can be formed as part of the relay device 610 or can be formed as a separate element permanently or removably attached to the relay device 610, is inserted into the bobbin so that first coil 620 surrounds the shaft. The illustrated shaft 640 has a cylindrical shape, although other suitable shapes can be used, and is formed as an integral extension from the relay device 610. An outer base 660 surrounds the first coil 620. The length of shaft 640 is in the example of about 25 mm. Shaft 640 and outer base 660 are advantageously of a ferromagnetic material, e.g., iron. When current passes through first coil 620, shaft 640 and outer base 660 help to close the magnetic path around coil 620.

In the H19 or K19 series relay device manufactured by CII Technologies, the arrangement of shaft 640, dimension of coil 620, and inductance value of the relay are pre-designed to generate a necessary magnetic field to overcome the tensile strength of a spring (not shown) that keeps armature 700 open.

In accordance with the present invention, a conventional relay is modified by extending a support shaft from the shaft 640 of the first coil and by extending the outer base 660 with a cylindrical base extension 670. The base extension 670 is closed by a relay bottom 680 at its end opposite outer base 660. The second shaft 650 and base extension 670 can be formed as integral extensions of the first shaft 640 and outer base 660 or can be formed as separate elements permanently or removably attached to the first shaft 640 and to the outer base 660, respectively. The illustrated second shaft 650 and base extension 670 in FIG. 6 are separate elements permanently attached to the first shaft 640 and to the outer base 660. The second shaft 650 and the base extension 670 are constructed similar to the first shaft 640 and outer base 660, respectively, unless otherwise noted, with the second shaft 650 having a length preferably about 90 mm. The outer diameter of shaft 650 is preferably about 17 mm.

Base extension 670 and relay bottom 680 are advantageously of a ferromagnetic material, e.g., iron.

A second coil support in the form of a second bobbin is physically and magnetically coupled to the relay device 610 via the extended shaft 650. A second coil 630 of wire is separated from first coil 620 in an electrical sense, that is, the electrical current cannot directly pass between the two coils. The separate coils 630, 620, however, need not be separated in a physical sense for purposes of the present invention. Shaft 640 and 650 and the outer metal part of the relay (comprising the relay base 660, the base extension 670 and the relay bottom 680 are all preferably configured such that the two bobbins for coils 620 and 630 do not include air gaps that could reduce the magnetic field strength, which would require a greater current value to configure the relay and to keep it configured.

The second coil 630 is constructed and arranged similar to the first coil 620, unless otherwise noted. For the specific application in the branching unit, the two coils should be electrically isolated. The isolation required is related to the maximum voltage that submarine systems maintain and, therefore, that the branching unit must achieve. Isolation of the two coils can be achieved in different ways that will be readily apparent to one of ordinary skill in the art. It is preferred that isolation between the coils is attained by winding the second coil with high voltage wire, specifically Reynolds HV Cable AWG 28, cod. 1788287. Similar isolation could be achieved by molding the second coil wound with low voltage wire with very high isolation material like polyethylene. The second coil 630 preferably has about 650 turns. With these turns, the external diameter of second coil 630 is preferably about 43 mm.

When constructed and arranged in accordance with the above dimensions and specifications, second coil 630 preferably provides a series resistance of about 11.3 Ohms. Also, second coil 630 preferably provides a series inductance of about 2.97 mH. High voltage isolation is up to at least about 18 KV and an even greater voltage could be achieved with the Reynolds HV Cable AWG 28, cod. 1788287.

FIG. 7 illustrates a side view of the double-coil relay of FIG. 6 consistent with the present invention. Arrows depict magnetic flux patterns emanating from both the first coil 620 and the second coil 630 when the currents flowing in both coils are arranged in such a way to generate magnetic fields with the same direction and therefore reinforcing each other. Together or separate, the flux from the two coils operate to open or close armature 700, which corresponds to two electrical switches for the relay 310 in FIG. 3A.

Those of ordinary skill in the art will appreciate that the design of relay 310 may vary depending on the requirements of the branching unit and submarine-cable system in which it is employed. For example, the type of wire, length, and number of turns for coils 620 and 630 will depend in part on the current thresholds that the system requires for opening and closing the armature 700 of relay 310 and on the physical dimensions of the relay, such as the shaft 640 and 650. Likewise, the design of the bobbins that support coils 620 and 630 and that are high-voltage isolated may vary depending on the electrical and physical specifications of the relay.

It will be apparent to those skilled in the art that various other modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A branching unit for joining power feed lines of at least three submarine cables, comprising:

first, second, and third cable terminations each coupled to a power feed line of a respective submarine cable;

a ground termination;

first, second, and third high-voltage relays each having a first coil and a first contact, the first coil of each high-voltage relay being positioned between two of the cable terminations respectively and having an energized state when a first threshold amount of current passes through the first coil and a de-energized state when a second threshold amount of current does not pass through the first coil, the first contact of each high-voltage relay being positioned to connect the respective third cable termination with the ground termination when the respective first coil is in an energized state, wherein at least one of the high-voltage relays includes a second coil in series with the respective third cable termination and the ground termination, the first contact of the at least one of the high-voltage relays being positioned to connect the respective third cable termination with at least another of the cable terminations when both the first coil and the second coil of the at least one of the high-voltage relays are in a de-energized state.

2. The branching unit of claim 1, wherein the first, second, and third high-voltage relays each further comprise a second contact being positioned to isolate the first and second cable terminations from each other when the respective first coil is in an energized state.

3. The branching unit of claim 1, wherein the first, second, and third high-voltage relays are arranged between the cable terminations in a delta network.

4. The branching unit of claim 1, wherein the respective terminations have at least one zener diode arranged in parallel with the first, second, and third high-voltage relays.

5. The branching unit of claim 1, wherein the first, second, and third high-voltage relays further comprise a diode bridge surrounding the coil.

6. The branching unit of claim 1, further comprising a current limiter positioned in series between the ground termination and sea earth.

7. The branching unit of claim 1, wherein the first coil enters the energized state with a current above about 60–100 mA and drops to the de-energized state with a current below about 25–50 mA.

8. A branching unit for joining power feed lines of at least three submarine cables, comprising:

first, second, and third cable terminations each coupled to a power feed line of a respective submarine cable;

a ground termination; and a high-voltage relay having a first coil in series with two of the cable terminations and a second coil in series with the third cable termination and the ground termination, the high-voltage relay including at least one contact positioned to connect the third cable termination to the ground termination when electrical current in the first coil exceeds a first predetermined threshold and positioned to disconnect the third cable termination from the ground termination when electrical current in the first coil falls below a second predetermined threshold and electrical current in the second coil falls below a third predetermined threshold.

9. The branching unit of claim 8, wherein the first predetermined threshold is about 60–100 mA.

10. The branching unit of claim 8, wherein the respective second and third predetermined thresholds for the first and second coils are 25–50 mA and 300–350 mA.

11. The branching unit of claim 8, further comprising two additional high-voltage relays arranged with the high-voltage relay between the first, second, and third cable terminations in a delta network.

12. Underwater optical telecommunication link comprising:

at least three submarine cables extended at least partly in a body of water and having first, second and third power feed terminations at respective landing points, each cable comprising at least an optical fiber and a power feed line electrically connected to the respective power feed termination;

at least two power stations at the landing points to feed said power feed lines of the submarine cables; and a branching unit in said body of water for joining said power feed lines of said submarine cable, wherein the branching unit comprises:

first, second, and third cable terminations each coupled to a power feed line of a respective submarine cable;

a ground termination; and a high-voltage relay having a first coil in series with two of the cable terminations and a second coil in series with the third cable termination and the ground termination, the high-voltage relay including at least one contact positioned to connect the third cable termination to the ground termination when electrical current in the first coil exceeds a first predetermined threshold and positioned to disconnect the third cable termination from the ground termination when electrical current in the first coil falls below a second predetermined threshold and electrical current in the second coil falls below a third predetermined threshold.

* * * * *